United States Patent
Maier

(10) Patent No.: US 12,011,138 B2
(45) Date of Patent: Jun. 18, 2024

(54) CONNECTION DEVICE, METHOD FOR MANUFACTURING A CONNECTION DEVICE, SCREW SLEEVE

(71) Applicant: FESTOOL GMBH, Wendlingen (DE)

(72) Inventor: Steffen Maier, Weissenhorn (DE)

(73) Assignee: FESTOOL GmbH, Wendlingen (DE)

( * ) Notice: Subject to any disclaimer, the term of this patent is extended or adjusted under 35 U.S.C. 154(b) by 307 days.

(21) Appl. No.: 17/292,040

(22) PCT Filed: Oct. 28, 2019

(86) PCT No.: PCT/EP2019/079400
§ 371 (c)(1),
(2) Date: May 7, 2021

(87) PCT Pub. No.: WO2020/099108
PCT Pub. Date: May 22, 2020

(65) Prior Publication Data
US 2021/0393096 A1 Dec. 23, 2021

(30) Foreign Application Priority Data
Nov. 12, 2018 (DE) .......................... 102018219285.5

(51) Int. Cl.
*A47L 9/24* (2006.01)
*A47L 7/00* (2006.01)
(Continued)

(52) U.S. Cl.
CPC ............ *A47L 9/242* (2013.01); *A47L 7/0095* (2013.01); *F16L 25/01* (2013.01); *F16L 27/0812* (2013.01); *F16L 33/24* (2013.01)

(58) Field of Classification Search
CPC ....... F16L 25/01; F16L 27/0812; F16L 33/24; F16L 27/1274; F16L 47/16; A47L 9/242; A47L 7/0095
See application file for complete search history.

(56) References Cited

U.S. PATENT DOCUMENTS 3,565,464 A * 2/1971 Wolf ...................... A47L 9/242
4,625,998 A 12/1986 Draudt et al.
(Continued)

FOREIGN PATENT DOCUMENTS

CN 1696561 11/2005
CN 1763409 4/2006
(Continued)

OTHER PUBLICATIONS

German Examination Report in corresponding German Application No. 102018219285.5, dated Aug. 27, 2019.
(Continued)

*Primary Examiner* — William S. Choi
(74) *Attorney, Agent, or Firm* — HSML P.C.

(57) ABSTRACT

A connection device for the fluidic connection of a suction tube to a function unit. The connection device includes a first hollow-cylindrical connection section and a second hollow-cylindrical connection section. One of the connection sections is connectable or connected to the suction tube and the other connection section is connectable or connected to the function unit. One of the connection sections is located at least partly within the other connection section and with its outer periphery bears on the inner periphery of the other connection section, where the two connection sections are rotatably mounted, in order to provide a rotation compensation for the suction tube, and where an electrical connection for providing an antistatic function exists between the two connection sections. The first connection section includes a spring section which is deformable in the radial direction and with which the bearing contact on the second connection element takes place.

15 Claims, 4 Drawing Sheets

(51) Int. Cl.
     *F16L 25/01*      (2006.01)
     *F16L 27/08*      (2006.01)
     *F16L 33/24*      (2006.01)

(56) References Cited

U.S. PATENT DOCUMENTS

| | | | |
|---|---|---|---|
| 4,887,849 A * | 12/1989 | Briet | |
| 5,350,202 A * | 9/1994 | Fritz | F16L 47/16 |
| 5,797,162 A | 8/1998 | Vystrcil et al. | |
| 6,108,861 A * | 8/2000 | Vystrcil | |
| 2009/0039647 A1 | 2/2009 | Schwarz et al. | |
| 2013/0099490 A1* | 4/2013 | Kwon | F16L 25/01 |
| 2017/0356580 A1 | 12/2017 | Huang | |
| 2019/0337823 A1* | 11/2019 | Leys | F16L 25/01 |

FOREIGN PATENT DOCUMENTS

| | | |
|---|---|---|
| CN | 101357053 | 2/2009 |
| DE | 102014119243 A1 | 6/2016 |
| DE | 102017115653 A1 | 1/2019 |
| WO | 2019011591 A1 | 1/2019 |

OTHER PUBLICATIONS

International Search Report and Written Opinion in corresponding PT Application No. PCT/EP2019/079400, dated Jan. 24, 2020.
Office Action issued in parallel Chinese Patent Application No. 2019800744173, dated Jun. 16, 2022, 24 pages w/translation.

* cited by examiner

CONNECTION DEVICE, METHOD FOR MANUFACTURING A CONNECTION DEVICE, SCREW SLEEVE

FIELD OF THE INVENTION

The invention relates to a connection device for the fluidic connection of a suction tube to a function unit, in particular to a suction apparatus, to a tool and/or to a nozzle, wherein the connection device comprises a first hollow-cylindrical connection section and a second hollow-cylindrical connection section, wherein one of the connection sections is connectable or connected to the suction tube and the other connection section is connectable or connected to the function unit, wherein one of the connection sections is located at least partly within the other connection section and with its outer periphery bears on the inner periphery of the other connection section, wherein the two connection sections are rotatably mounted to one another, in order to provide a rotation compensation for the suction tube, and wherein an electrical connection for providing an antistatic function exists between the two connection sections.

The first hollow-cylindrical connection section is, for example, a screw sleeve and the second connection section is, for example, a bushing. The first connection section is expediently screwed on the suction tube and is inserted into the second connection section. The second connection section is fastened for example to a suction apparatus. The first connection section bears with its outer periphery on the inner periphery of the second connection section. By way of this, in particular an electrical contact is created between the first connection section and the second connection section, said electrical contact serving for providing the antistatic function. An electrical connection to an earth lead is thus created via the suction tube and the connection device, so that a static charging can be prevented.

The first connection section and the second connection section can be rotatably mounted to one another. In particular, the first connection section can be freely rotated relative to the second connection section. The rotatable mounting of the first connection section relative to the second connection section serves for providing a rotation compensation for the suction tube. The rotation compensation prevents a twisting of the suction tube occurring on operation, such twisting able to lead to an undesired course of the suction tube and/or to a stiffening of the suction tube.

For the rotation compensation, it is necessary for the first connection section to be able to be rotated relative to the second connection section without too large a force effort. In particular, the torque which is required for the rotation of the first connection section must be smaller than the torsion moment of the twisted suction tube. The torque which is necessary for the rotating of the first connection section depends on the friction between the first connection section and the second connection section. In order to keep the friction low, the outer diameter of the first connection section can be designed accordingly small relative to the inner diameter of the second connection section. In this case however, there is the risk of the two connection sections no longer sufficiently contacting, so the electrical contact between the connection sections is compromised, whereby the antistatic function is no longer given.

SUMMARY OF THE INVENTION

It is an object of the invention to modify the initially mentioned connection device such that the rotation compensation as well as the antistatic function can be reliably provided.

The object is achieved by a connection device as discussed below.

The first connection section of the connection device comprises a spring section which is deformable in the radial direction. The bearing contact of the first connection section on the second connection section takes place with this spring section.

The spring section forms the outer periphery, with which the first connection section bears on the inner periphery of the second connection section. The spring section is deformable, in particular elastically deformable, in the radial direction. The spring section can yield with respect to the inner periphery of the second connection section on account of its deformability. By way of this, the first connection section remains rotatable with respect to the second connection section in a sufficiently easy manner even in the case of a larger outer diameter. The outer diameter of the first connection section (given a constant inner diameter of the second connection section) can accordingly be designed larger than was hitherto the case, by which means it can be ensured that the two connection sections constantly contact and thus the antistatic function is also constantly given.

Advantageous further developments are explained hereinafter.

The first connection section is preferably a screw sleeve. The second connection section is preferably a bushing.

The spring section preferably comprises one or plural slots. The one or the plural slots preferably run in the axial direction of the first connection section. The one or plural slots in particular run up to the first face side of the first connection section. Expediently, the plural slots are arranged distributed about the periphery of the first connection section. The deformability of the spring section can be ensured in a simple way and manner by way of the slots.

Preferably, the spring section is an axial section of the first connection section. Expediently, the spring section in a non-deformed state defines the maximal outer periphery of the first connection section. In a state, in which the outer periphery bears on the inner periphery, the spring section is expediently elastically deformed.

Furthermore, an arrangement is provided, comprising a suction tube, a function unit and a connection device which is described above, wherein the connection device provides an electrical and fluidic connection between the suction tube and the function unit.

Furthermore, a method for manufacturing a connection device according to one of the preceding claims is provided, comprising the steps; manufacturing the first connection section with a first manufacturing tolerance, according to which the outer diameter of the first connection section is situated in a first tolerance range, manufacturing the second connection section with a second manufacturing tolerance, according to which the inner diameter of the second connection section is situated in a second tolerance range, wherein the difference between the upper limit value of the first tolerance range is larger than the lower limit value of the second tolerance range.

The upper limit value of the first tolerance range is preferably 0.1 mm, in particular at least 0.15 mm or at least 0.2 mm larger than the lower limit value of the second tolerance range.

Preferably, the lower limit value of the first tolerance range is maximally 0.4 mm, in particular maximally 0.3 mm smaller than the upper limit value of the second tolerance range.

Furthermore, a screw sleeve of an electrically conductive plastic is provided, comprising a hollow-cylindrical base section which comprises an inner thread, with which the screw sleeve can be screwed onto a suction tube, wherein a hollow-cylindrical spring section connects onto the base section in the axial direction, said spring section comprising a plurality of slots which run in the axial direction, being elastically deformable radially inwards and in a non-deformed state defining the maximal outer periphery of the screw sleeve.

In particular, the screw sleeve can be used as the aforementioned, first connection section.

The spring section, in particular the first connection section, for example the screw sleeve, by way of example is manufactured of polypropylene, in particular of a thermoplastic plastic. Expediently, the spring section, in particular the first connection section, for example the screw sleeve comprises soot particles, via which the electrical conductively is ensured.

The term "electrically conductive plastic" is therefore in particular a plastic, for example polypropylene, with admixed, electrically conductive particles, for example electrically conductive soot articles.

BRIEF DESCRIPTION OF THE DRAWINGS

The subsequent exemplary embodiments are described hereinafter with reference to the figures. Herein are shown in FIG. 1 an arrangement of a suction apparatus, a suction tube, a function unit and two connection devices, FIG. 2 a perspective view of a screw sleeve, FIG. 3 a further perspective view of a screw sleeve, FIG. 4 a connection device, FIG. 5 a section through the connection device along the section line A-A of FIG. 4, FIG. 6 tolerance ranges on manufacture of a connection device, and FIG. 7 a flow diagram of a method for manufacturing a connection device.

DETAILED DESCRIPTION OF THE INVENTION

Figure 1:
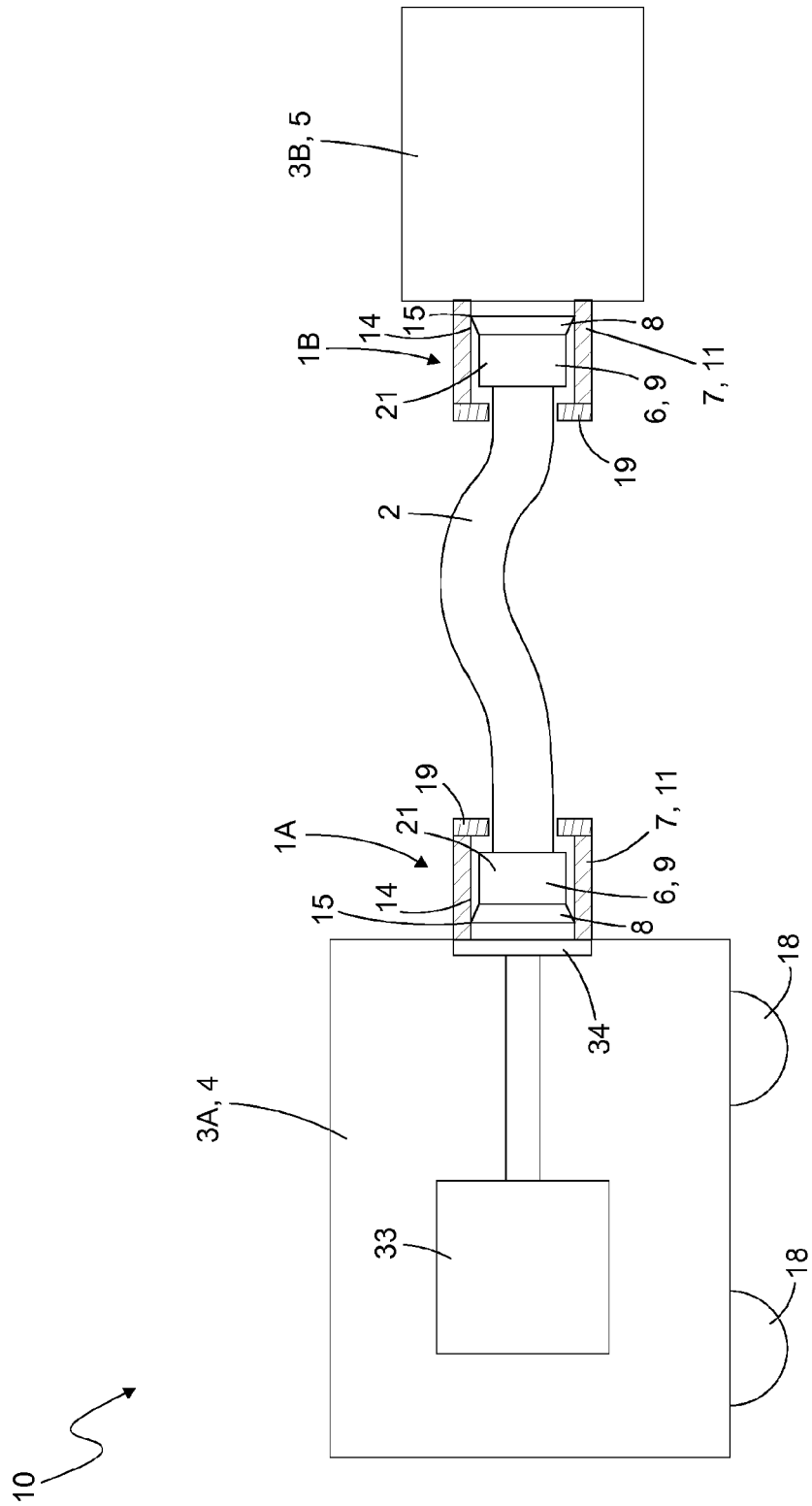

FIG. 1 shows an arrangement 10 which comprises a first function unit 3A, a second function unit 3B, a suction tube 2, a first connection device 1A and a second connection device 1B. The arrangement 10 represents an exemplary application context for the connection devices 1A and 1B. The connection devices 1A and 1B can also each be provided on their own.

The first connection device 1A serves for electrically and fluidically connecting the first function unit 3A to the suction tube 2. The second connection device 1B serves for electrically and fluidically connecting the second function unit 3B to the suction tube 2.

It is to be pointed out that the arrangement 10 can alternatively also comprise only one of the connection devices 1A, 1B. The connection of the suction tube 2 to the respective other function unit 3A or 3B can then be effected in another manner, for example by way of a conventional function device or by way of a direct connection. For example, the second function unit 3B can be connected directly to the suction tube 2.

The first function unit 3A is a suction apparatus 4. By way of example, the suction apparatus 4 is designed as a mobile vacuum cleaner which comprises several wheels 18, with which the mobile vacuum cleaner is supported with respect to the floor and can be moved relative to the floor. The suction apparatus 4 comprises a vacuum unit 33, with which a vacuum can be provided at a port 34 of the suction apparatus 4. The vacuum unit 33 is preferably a fan. The suction apparatus 4 further comprises a (not shown) earth lead which is electrically connected to the suction tube 2 via the first connection device 1A.

The suction tube 2 creates a fluidic connection between the suction apparatus 4, in particular the port 34, and the second function unit 3B. The suction tube 2 is connected to the suction apparatus 4, in particular to the port 34, via the first connection device 1A. Sucked air or and/or particles are transported into the suction apparatus 4 via the suction tube 2 and the first connection device 1A.

The suction tube 2 is expediently electrically conductive, so that an electrical connection between the suction apparatus 4 and the second function unit 3B can be provided by way of the suction tube 2. This electrical connection runs from the second function unit 3B via the (optionally provided) second connection device 1B, the suction tube 2 and the first connection device 1A to the suction apparatus 4. The electrical connection in particular ends at the earth lead of the suction apparatus. The ohmic resistance of the electrical connection is expediently less than 10 Megaohm. An antistatic function is provided with the help of the electrical connection; i.e. static charges at the suction tube 2 and/or the second function unit 3B are lead away to the earth lead of the suction apparatus 4 via the electrical connection.

The suction tube 2 is manufactured in particular of a flexible material, so that the suction tube 2 is flexibly adaptable in its course.

The second function unit 3B comprises for example a tool 5 and/or a nozzle. The second function unit 3B in particular is a working means. The tool 5 can be for example an electric tool, expediently a saw, grinder, or drill. The second function unit 3B is connected onto the suction tube 2 via the second connection device 1B. Dust which arises and/or is present in the region of the function unit 3B can be sucked directly at the function unit 3B and be transported to the suction apparatus 4 via the suction tube 2. The dust is expediently transported from the function unit 3B via the second connection device 1B (inasmuch as this is present), the suction tube 2 and the first connection device 1A, to the suction apparatus 4.

Hereinafter, the two connection devices 1A and 1B are dealt with in more detail. The two connection devices 1A and 1B can be designed identically or differently. The subsequently explained features are expediently present at both connection devices 1A, 1B. Hereinafter, primarily the first connection device 1A will be dealt with. The subsequent explanations expediently apply in correspondence also to the second connection device 1B and in particular to its relation to the second function unit 3B.

The connection device 1A comprises a first connection section 6 and a second connection section 7. The two connection sections 6, 7 are expediently manufactured of an electrically conductive material, in particular of an electrically conductive plastic. The electrical resistance of the connection sections 6, 7 is expediently less than 10 Megaohm.

Firstly to the first connection section 6:

The first connection section 6 is connected to the suction tube 2, in particular is fastened to this. The first connection section 6 for example is a screw sleeve 9 and is expediently screwed onto the suction tube 2. The first connection section 6 is hollow-cylindrical. The outer cylinder jacket of the connection section 6 forms the outer periphery 15. Expediently, no thread is present on the outer periphery 15. The first connection section 6 comprises a free, cylindrical interior which functions as a conduit section of the fluidic connection between the suction tube 2 and the function unit 3A.

The first connection section 6 is subdivided in the axial direction into two axial sections—into a spring section 8 and a base section 21. The spring section 8 is located on the side which faces away from the suction tube 2 and the base section 21 is situated on the side which faces the suction tube 2. The spring section 8 is deformable in the radial direction, in particular is more easily deformable in the radial direction than the base section 21. Expediently, the spring section 8 is elastically deformable in the radial direction. The spring section 8 by way of example assumes at least ⅙ and at the most ¼ of the axial extension of the first connection section 6.

The outer diameter of the first connection section 6 is expediently larger than the axial extension of the first connection section 6.

The base section 21 by way of example comprises a smaller outer diameter than the spring section 8. Coming from the base section 21, the outer diameter of the spring section 8 increases in the axial direction away from the base section 21. In the axial region with the maximal outer diameter, the spring section 8 bears on the inner periphery 14 of the second connection section 7. The spring section 8 forms the outer periphery 15 of the first connection section 6 which bears on the inner periphery 14 of the second connection section 7. Expediently, the spring section 8 is deformed inwards in the radial direction, in particular in an elastic manner, by way of the inner periphery 14.

Now to the second connection section 7:

The second connection section 7 is connected to the function unit 3A, in particular is fastened to this. The second connection section 7 is for example a bushing 11 or a section of a bushing. The second connection section 7 is hollow-cylindrical. The inner cylinder jacket of the second connection section 7 forms the inner periphery 14. The second connection section 7 comprises a cylindrical interior. Expediently, no thread is present on the inner periphery of the second connection section 7.

Hereinafter, the interaction of the two connection sections 6, 7 is to be dealt with:

The first connection section 6 is located within the second connection section 7. By way of example, the first connection section 6 is completely inserted into the hollow-cylindrical second connection section 7, in particular into its cylindrical interior. The first connection section 6 bears with its outer periphery 15 on the inner periphery 14 of the second connection section 7. In particular, the first connection section 6 bears with the spring section 8 on the inner periphery 14.

By way of the spring section 8 bearing on the inner periphery 14, an electrical contact is created between the two connection sections 6, 7. An electrical connection of in particular less than 10 Megaohm, with which the initially mentioned antistatic function is provided, exists between the two connection sections 6, 7.

The two connection sections 6, 7 are rotatably mounted to one another, in order to provide a rotation compensation for the suction tube 2. The first connection section 6 is rotatable, in particular freely rotatable relative to the second connection section 7 about its longitudinal axis.

A fastening ring 19 is arranged on the face side of the second connection section 7 which faces away from the first function unit 3A, said fastening ring preventing the first connection section 6 from being able to be pulled out of the second connection section 7. The inner diameter of the fastening ring 19 is smaller than the outer diameter of the first fastening section 6. The fastening ring 19 comprises a ring opening, through which the suction tube 2 runs into the second connection section 7.

Figure 2:
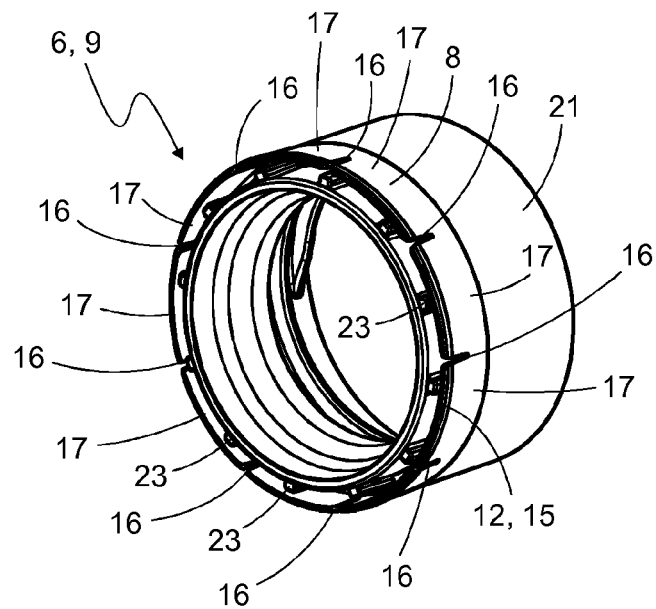
Figure 3:
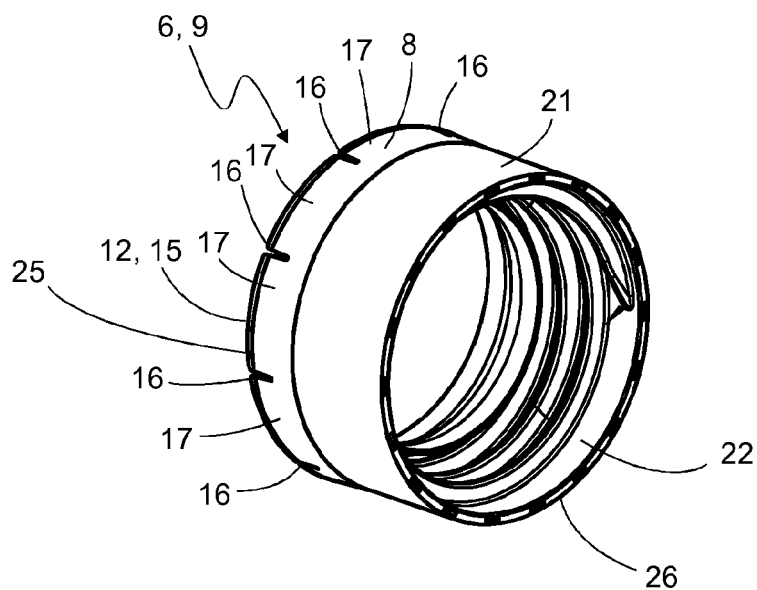

A possible design of the first connection section 6 is hereinafter dealt with in regard to the FIGS. 2 and 3. The first connection section 6 here by way of example is designed as a screw sleeve 9. The screw sleeve 9 can also be providing on its own.

The first connection section 6 is expediently designed as was explained beforehand. The first connection section 6 comprises the spring section 8 which also here is an axial section, in particular an axial end section, of the first connection section 6. The spring section 8 extends up to the first face side 25 of the first connection section 6. The spring section 8 is hollow-cylindrical, in particular ring-shaped. Expediently, no inner thread and/or no outer thread is provided on the spring section 8.

By way of example, the spring section 8 comprises an annular bead 12, via which the bearing contact of the spring section 8 on the inner periphery 14 is effected. The annular bead 12 is located in the region of the first face side 25. The annular bead 12 forms the outer periphery 15.

The spring section 8 comprises several slots 16. The slots 16 run in the axial direction of the first connection section 6, in particular parallel to the axial direction. The slots 16 in particular run up to the first face side 25 of the first connection section 6. The slots 16 in particular run out at the first face side 25. The slots 12 run through the annular bead 12.

Expediently, the several slots 16 are arranged distributed around the periphery of the first connection section 6. In particular, the slots 16 are arranged at the same angular distances to one another. Preferably, at least 6, 7, 8, 9 or 10 slots 16 are present. Expediently, exactly 6, 7, 8, 9 or 10 slots 16 are present.

The slots 16 are expediently only present in the spring section 8 and end here. The slots 16 in particular do not extend into the base section 21. The slots 16 expediently extend over at least ⅐ or at least ⅙ of the axial extension of the first connection section 6 and preferably over at the most ⅕ of the axial extension of the first connection section 6.

By way of example, the slots 16 are each between 4 mm to 6 mm, in particular 4.5 mm to 5.5 mm, preferably 4.9 mm long. The slots are preferably between 0.3 mm and 0.7 mm, preferably 0.5 mm wide Between two adjacent slots 16 a respective peripheral section 17 is located. The outer extension of the peripheral sections 17 in the circumferential direction—thus the circular arc between two adjacent slots 16—is expediently 15 mm to 20 mm.

The base section 21 comprises an inner thread 22, with which the first connection section 6 is screwed or can be screwed on the suction tube 2. The inner thread 22 expediently extends up to the second face side 26 of the first connection section 6.

The base section 21 and the spring section 8 together form an outer cylindrical section. An inner cylindrical section 24 lies within this outer cylindrical section. The inner cylindrical section 24 extends in the axial direction from the first face side 25 up to the middle axial region of the connection section 6. The inner cylindrical section 24 overlaps with the inner thread 22 in the axial direction. The inner cylindrical section 24 is connected to the base section 21 via an annular connection section. The inner cylindrical section 24 comprises a plurality of ribs 23, which coming from the first face side 25 run in the axial direction and are arranged at the outside on the inner cylindrical section 24. The ribs 23 are distributed around the periphery of the inner cylindrical section 24. The ribs 23 are expediently radially distanced to the spring section 8. The ribs 23 preferably assume the same axial region as the spring section 8.

The length—thus the axial extension—of the first connection section 9 is expediently between 20 mm to 40 mm, in particular between 27 mm and 33 mm. The outer diameter of the first connection section 9 is expediently between 35 mm and 55 mm.

A possible design of the first connection device 1A is hereinafter dealt with in regard to the FIGS. 4 and 5. The first connection device 1A is expediently designed as explained above. The second connection device 1B is expediently designed in accordance with this.

The fastening ring 19 is situated on the face side of the connection device 1A which faces the suction tube 2. The fastening ring 19 bears on the face side and on the inner periphery of the second connection section 7. The fastening ring 19 is releasably fastened to the second connection section 7, by way of example via a latching connection 28.

The second connection section 7 by way of example comprises an outer cylindrical section 31 and an inner cylindrical section 32. The inner cylindrical section 32 connects onto the first connection section 6 in the axial direction. The first connection section 6 is arranged between the fastening ring 19 and the inner cylindrical section 32 in the axial direction, so that the first connection section 6 is limited in its movement in the axial direction relative to the second connection section 7 on both sides.

The first connection section 6 and the second connection section 7 together provide a fluid conduit 29, via which air and/or particles can be transported between the suction tube 2 and the function unit 3A.

Figure 5:
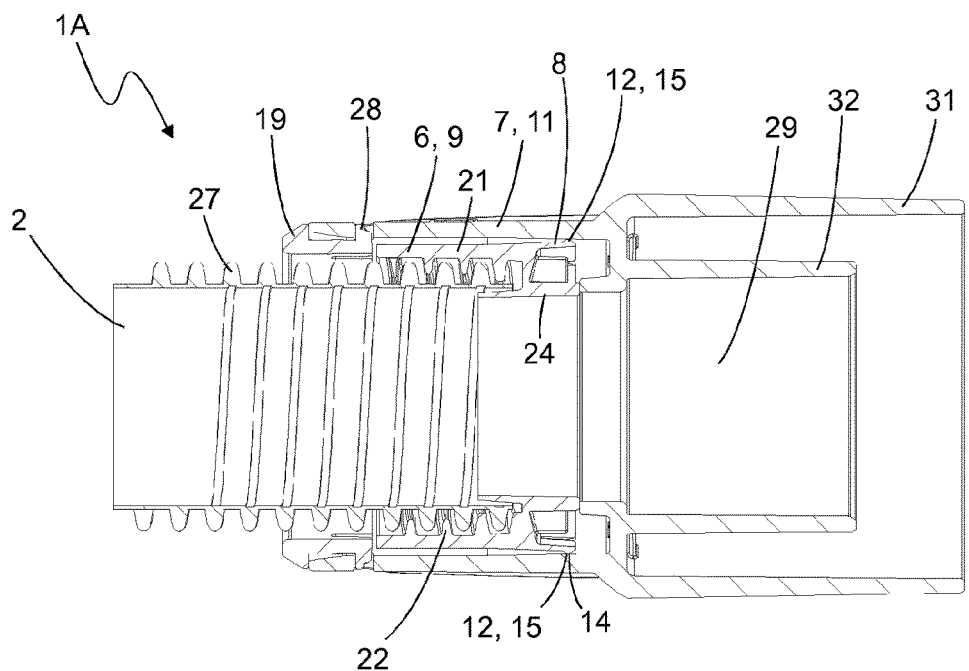

As is to be seen in FIG. 5, the first connection section 7 bears with the outer periphery 15 of the spring section 8, in particular with the outer periphery of the annular bead 12, on the inner periphery 14.

Figure 4:
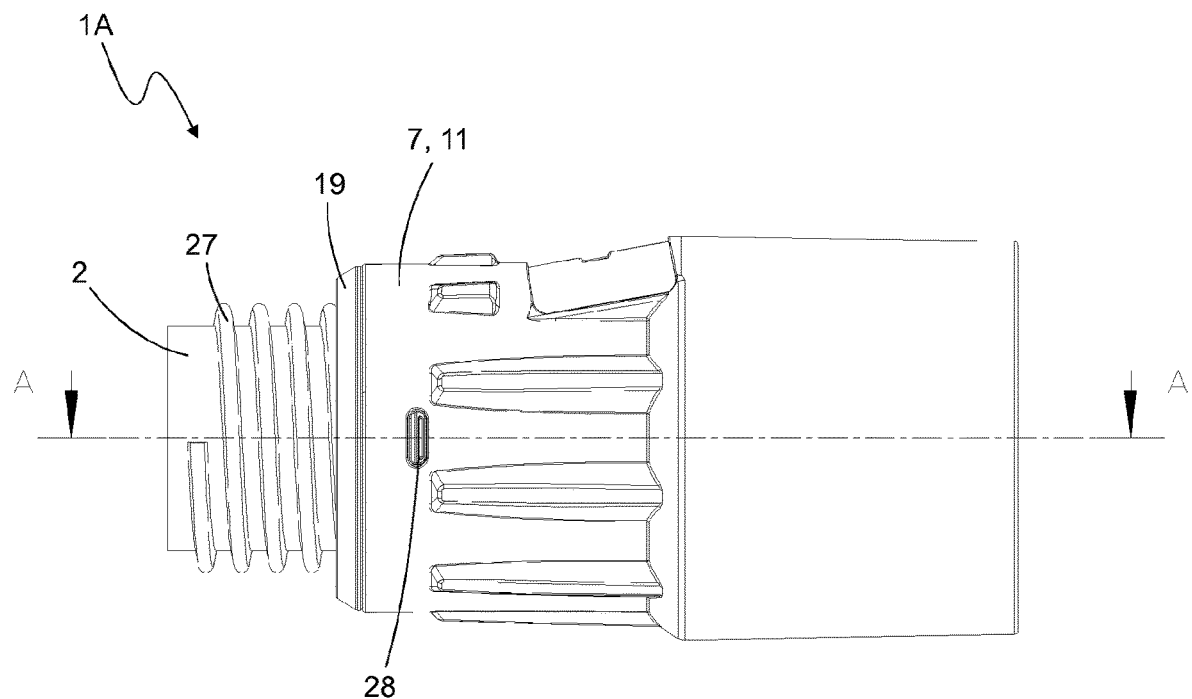

In FIGS. 4 and 5, the connection section 6 is screwed on the suction tube 2. The suction tube 2 comprises an outer thread 27, onto which the first connection section 6 is screwed.

Expediently, a corresponding outer thread is present on both ends of the suction tube 2. Expediently, a connection section 6 is screwed on both ends of the suction tube 2.

Figure 6:
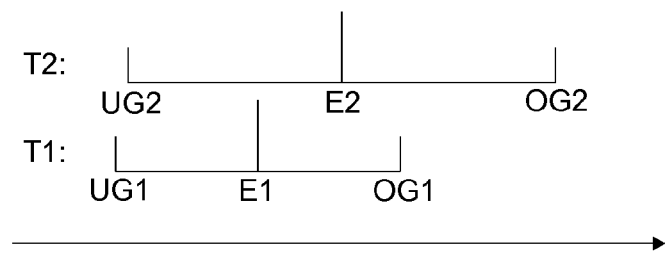

The manufacture of the connection device 1A is dealt with hereinafter in more detail with reference to the FIGS. 6 and 7.

The connection device 1A is usefully manufactured by way of injection moulding. Preferably, the first connection section 6 and the second connection section 7 are each manufactured as individual components, in particular as individual injection moulded components.

The connection sections 6 and 7 on manufacture are each subjected to respective manufacturing tolerances which in particular relate to the outer diameter of the first connection section 6 and the inner diameter of the second connection section 7. On account of the manufacturing tolerances, a first tolerance range T1 results for the outer diameter of the first connection section 6 and a second tolerance range T2 for the inner diameter of the second connection section 7. If a plurality of first connection sections 6 and second connection sections 7 is manufactured, then the outer diameter and the inner diameter of the manufactured connection sections 6, 7 lie distributed within the tolerance ranges T1, T2 on account of the manufacturing tolerances of the manufacturing method.

The two tolerance ranges T1, T2 can each be defined via an expectation value E1, E2, an upper limit value OG1, OG2 and a lower limit value UG1, UG2.

On manufacturing a plurality of connection sections 6, 7, on account of these manufacturing tolerances, there will be connection sections 6, 7 whose outer diameter or inner diameter lies at one of the limit values OG1, OG2, UG1, UG2.

On manufacture of a connection device 1A, a first connection section 6 is combined with a second connection section 7. Herein, it is to be ensured that the rotation compensation mentioned above as well as the antistatic function mentioned above is given for each manufactured connection device 1A. In particular, this can be ensured by the subsequently explained selection of the tolerance ranges T1, T2.

In particular, the tolerance ranges T1, T2 are selected in a manner such that the upper limit value OG1 of the first tolerance range T1 is greater than the lower limit value UG2 of the second tolerance range T2.

This means that it is explicitly permitted for the outer diameter of the first connection section 6 to be larger than the inner diameter of the second connection section 7 in the case which is most unfavourable for the rotation compensation—specifically the combination of the limit values OG1 and UG2. Here, to a certain extent there is an "overlapping" of the outer diameter and inner diameter. On account of the elastically deformable spring section 8, even in this case one can ensure that a rotation movement of the first connection section 6 relative to the second connection section 7 is smooth enough, in order to provide the rotation compensation.

By way of example, the upper limit value OG1 of the first tolerance range T1 is at least 0.1 mm, in particular at least 0.15 mm larger than the lower limit value UG of the second tolerance range T2.

By way of the selection of a larger upper limit value OG1 for the outer diameter, the first tolerance range T1 (compared to the state of the art) can be shifted further to the "right"—thus towards larger outer diameters. By way of this, the maximal distance between the lower limit value UG1 of the outer diameter and the upper limit value OG2 of the inner diameter can be reduced, so that even in the case which is most unfavourable for the anti-static function—specifically the combination of the limit values UG1 and OG2—the electrical contact between the two connection sections 6, 7 is given and the antistatic function is provided.

By way of example, the lower limit value UG1 of the first tolerance range T1 is maximally 0.4 mm, in particular maximally 0.3 mm smaller than the upper limit value UG2 of the second tolerance range T2.

The first tolerance range T1 is expediently smaller than or equally large as the second tolerance range T2. The first tolerance range T1—thus the difference between OG1 and UG1—is expediently 0.2 mm. The second tolerance range T2—thus the difference between OG2 and UG2—is expediently 0.2 mm or 0.3 mm.

Exemplary values for the two tolerance ranges T1, T2 are specified in the subsequent table, and specifically for three different types of first connection section 6 and second connection section 7. A first connection section 6 and a second connection section 7 of the same type are combined for manufacturing a connection device.

|  | Outer diameter of the first connection section 6 (mm) | Inner diameter of the second connection section 7 (mm) |
| --- | --- | --- |
| type 1 | 40.05 ± 0.1 | 40.09 ± 0.1 |
| type 2 | 46.05 ± 0.1 | 46.13 ± 0.15 |
| type 3 | 51.65 ± 0.1 | 51.65 ± 0.15 |

Figure 7:
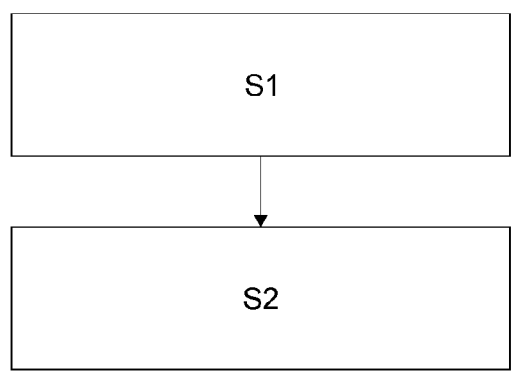

FIG. 7 shows a flow diagram of a method for manufacturing a connection device 1A which has been explained above. The method comprises the steps: manufacturing S1 the first connection section 6 with a first manufacturing tolerance, according to which the outer diameter of the first connection section 6 is situated in a first tolerance range T1, manufacturing S2 the second connection section 7 with a second manufacturing tolerance, according to which the inner diameter of the second connection section 7 is situated in a second tolerance range T2, wherein the upper limit value OG1 of the first tolerance range T1 is larger than the lower limit value UG2 of the second tolerance range T2.

The method expediently comprises the further step of the inserting of the first connection section 6 into the second connection section 7.

Expediently, a plurality of first connection sections 6 and second connection sections 7 is manufactured by way of the manufacturing method. Included in this is at least one first connection section 6 with an upper limit value OG, a first connection section 6 with a lower limit value UG1, a second connection section 7 with an upper limit value OG2 and a second connection section 7 with a lower limit value UG2. The limit values OG1, OG2, UG1, UG2 expediently have one or more of the relations explained above.

The plurality of connection sections 6, 7 is used for manufacturing connection devices.

Further exemplary details are to be explained hereinafter.

The suction tube 2 expediently comprise a textile sheath. The textile sheath is preferably electrically conductive.

The screw sleeve 9 is rotatably mounted in the sleeve 11 without limitation. The screw sleeve 9 and the bushing 11 consist of a conductive plastic. The antistatic conductivity from the screw sleeve 9 to the bushing 11 is provided by way of the annular bead 12 which slides in the inner diameter of the bushing 11.

The screw sleeve 9 and the bushing 11 are expediently manufactured by way of injection moulding. The manufacturing method for the screw sleeve 9 and the bushing 11 has a maximum tolerance for the inner diameter of the bushing 11 and the outer diameter of the screw sleeve 9 in each case of ±0.1 mm.

For conventional connection devices, in the two most unfavourable tolerance pairings an air gap between the bushing 11 and the screw sleeve 9 can occur (by which means the electrical conductivity is compromised) or a pressing of the two parts can occur, which can lead to a loss of the rotation compensation The screw sleeve 9 here is slotted in the region of the annular bead 12, so that spring segments form, these reducing the effect of the clamping.

On manufacture, the tolerances of the bushing 11 and of the screw sleeve 9 are designed such that even in the most unfavourable case of the pairing, a contact of the bushing 11 and screw sleeve 9 is given and the antistatic conductivily is hence ensured. In the extreme case, in which the outer diameter of the screw sleeve 9 is maximal and the inner diameter of the sleeve 11 is minimal, a clamping of the screw sleeve 9 is prevented by the spring effect of the spring section.

The dimensions of the screw sleeve and the bushing are designed such that:
a maximal overlapping of 0.2 mm results given the largest outer diameter of the screw sleeve and the smallest inner diameter of the bushing.
on account of the tolerances given the smallest outer diameter of the screw sleeve and the largest inner diameter of the bushing, 0.3 mm of play results between the screw sleeve and the bushing.

The invention claimed is:

1. A connection device for a fluidic connection of a suction tube to a function unit, wherein the connection device comprises:
a first connection section and a second connection section,
wherein one of the connection sections is connectable or connected to the suction tube and the other connection section is connectable or connected to the function unit,
wherein one of the connection sections is located at least partly within the other connection section and an outer periphery of the one connection section bears on an inner periphery of the other connection section,
wherein the two connection sections are rotatably mounted to one another, in order to provide a rotation compensation for the suction tube,
wherein an electrical connection for providing an antistatic function exists between the two connection sections, and
wherein the first connection section comprises a spring section which is deformable in the radial direction and with which the first connection section bears on the second connection section,
wherein the connection device comprises a fastening ring arranged on a face side of the second connection section, the face side of the second connection section facing away from the function unit, wherein an inner diameter of the fastening ring is smaller than an outer diameter of the first connection section, wherein the fastening ring comprises a ring opening, wherein the suction tube runs into the second connection section through the ring opening, wherein the fastening ring is releasably fastened to the second connection section via a latching connection.

2. The connection device according to claim 1, wherein the spring section comprises one or plural slots.

3. The connection device according to claim 2, wherein the one or plural slots run in the axial direction of the first connection section.

4. The connection device according to claim 2, wherein the one or plural slots run up to a first face side of the first connection section.

5. The connection device according to claim 2, wherein the plural slots are arranged and distributed around the outer periphery of the first connection section.

6. The connection device according to claim 1, wherein the spring section is an axial section of the first connection section.

7. The connection device according to claim 1, wherein the spring section in a non-deformed state defines the maximal outer circumference of the first connection section.

8. The connection device according to claim 1, wherein the first connection section is a screw sleeve.

9. The connection device according to claim 8, wherein the screw sleeve comprises a hollow-cylindrical base section which comprises a thread with which the screw sleeve can be screwed onto the suction tube, the spring section further comprising a hollow-cylindrical spring section which follows the base section in the axial direction, said spring section comprising a plurality of slots which run in the axial direction, said spring section being elastically deformable inwards in the radial direction and in a non-deformed state defining the maximal outer periphery of the screw sleeve.

10. The connection device according to claim 1, wherein the second connection section is a bushing or a section of a bushing.

11. The connection device according to claim 1, wherein the first connection section is hollow-cylindrical and/or the second connection section is hollow-cylindrical.

12. The connection device according to claim 1, wherein the second connection section encloses the first connection section, wherein the spring section presses, due to its spring force, radially outwards against the second connection section to provide the electrical connection between the two connection sections.

13. The connection device according to claim 1, wherein in an axial direction of the connection device starting from the face side of the second connection section the spring section is arranged further in the second connection section than the fastening ring.

14. An arrangement, comprising:
  a suction tube,
  a function unit, and
  a connection device,
  wherein the connection device provides an electrical and fluidic connection between the suction tube and the function unit,
  wherein the connection device comprises a first connection section and a second connection section,
  wherein one of the connection sections is connected to the suction tube and the other connection section is connected to the function unit,
  wherein one of the connection sections is located at least partly within the other connection section and with an outer periphery of the one connection section bears on an inner periphery of the other connection section,
  wherein the two connection sections are rotatably mounted to one another, in order to provide a rotation compensation for the suction tube,
  wherein an electrical connection for providing an antistatic function exists between the two connection sections, and
  wherein the first connection section comprises a spring section which is deformable in the radial direction and with which the first connection section bears on the second connection section is provided,
  wherein the connection device comprises a fastening ring arranged on a face side of the second connection section, the face side of the second connection section facing away from the function unit, wherein an inner diameter of the fastening ring is smaller than an outer diameter of the first connection section, wherein the fastening ring comprises a ring opening, wherein the suction tube runs into the second connection section through the ring opening, wherein the fastening ring is releasably fastened to the second connection section via a latching connection.

15. The arrangement according to claim 14, wherein the function unit comprises a suction apparatus, a tool and/or a nozzle.

* * * * *